United States Patent [19]
Orndorff, Jr. et al.

[11] Patent Number: 5,372,430
[45] Date of Patent: Dec. 13, 1994

[54] BEARING ASSEMBLY

[75] Inventors: Roy L. Orndorff, Jr., Kent; Nicholas Tiedeman, Cuyahoga Falls, both of Ohio

[73] Assignee: The B. F. Goodrich Company, Akron, Ohio

[21] Appl. No.: 169,931

[22] Filed: Dec. 20, 1993

Related U.S. Application Data

[63] Continuation-in-part of Ser. No. 930,639, Aug. 17, 1992, abandoned, which is a continuation of Ser. No. 382,463, Jul. 20, 1989, abandoned, which is a continuation of Ser. No. 181,897, Apr. 15, 1988, abandoned.

[51] Int. Cl.$^5$ ............................................. F16C 33/22
[52] U.S. Cl. ......................................... 384/98; 384/116
[58] Field of Search ................... 384/97, 98, 116, 125, 384/220, 282, 297, 310, 904

[56] References Cited

U.S. PATENT DOCUMENTS

| | | | |
|---|---|---|---|
| 407,779 | 12/1865 | Satterthwaite et al. | |
| 3,932,004 | 1/1976 | Orndorff, Jr. | 384/97 |
| 4,577,379 | 3/1986 | Kramer | 29/149.5 S |
| 4,607,964 | 8/1986 | Kramer et al. | 384/98 |

OTHER PUBLICATIONS

Book entitled "Theory and Practice of Lubrication for Engineers", Prof. Dudley D. Fuller, Columbia University, published 1984, pp. 464–468.

*Primary Examiner*—Thomas R. Hannon

[57] ABSTRACT

A bearing assembly for supporting a drive shaft as of a ship wherein the shaft is generally to be supported by such bearing assembly in a horizontally extending position. The bearing assembly has a housing with a cylindrical shell mounted therein having a central bore with a longitudinally extending central axis. The shell may either have a first set of circumferentially spaced staves that are not evenly spaced circumferentially to support the drive shaft, or have a first set and a second set of staves that are circumferentially spaced such that the first set contact the drive shaft while the second set do not contact the drive shaft under normal conditions of load. All of the staves have resilient elastomeric strips that project into the central bore of the shell.

41 Claims, 5 Drawing Sheets

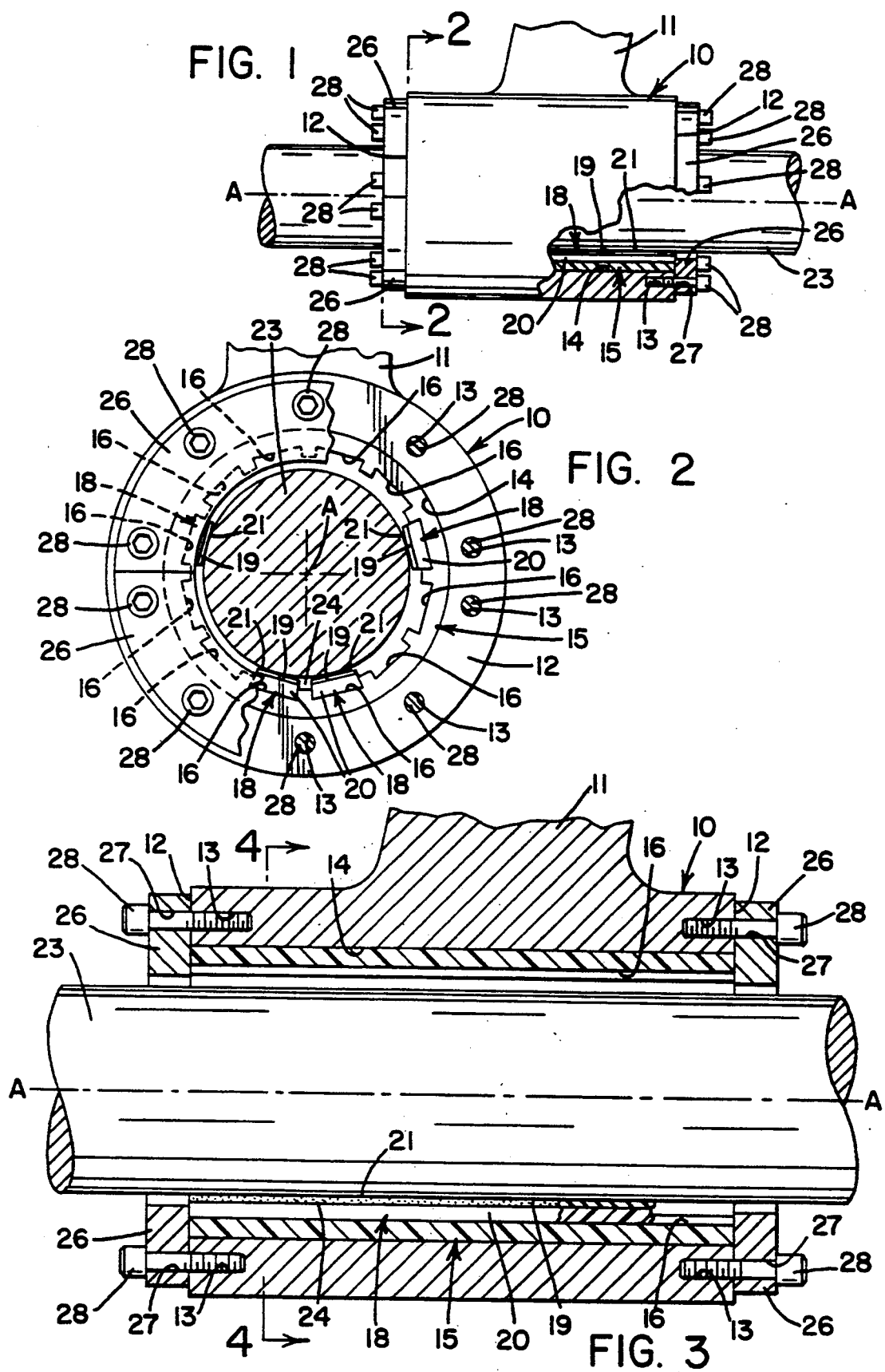

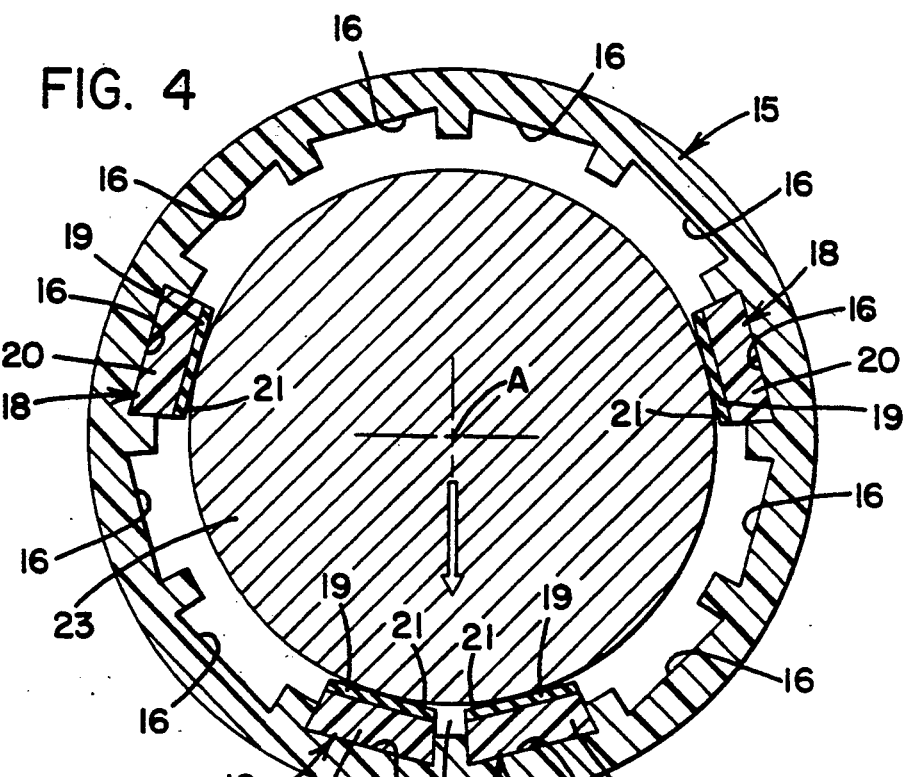
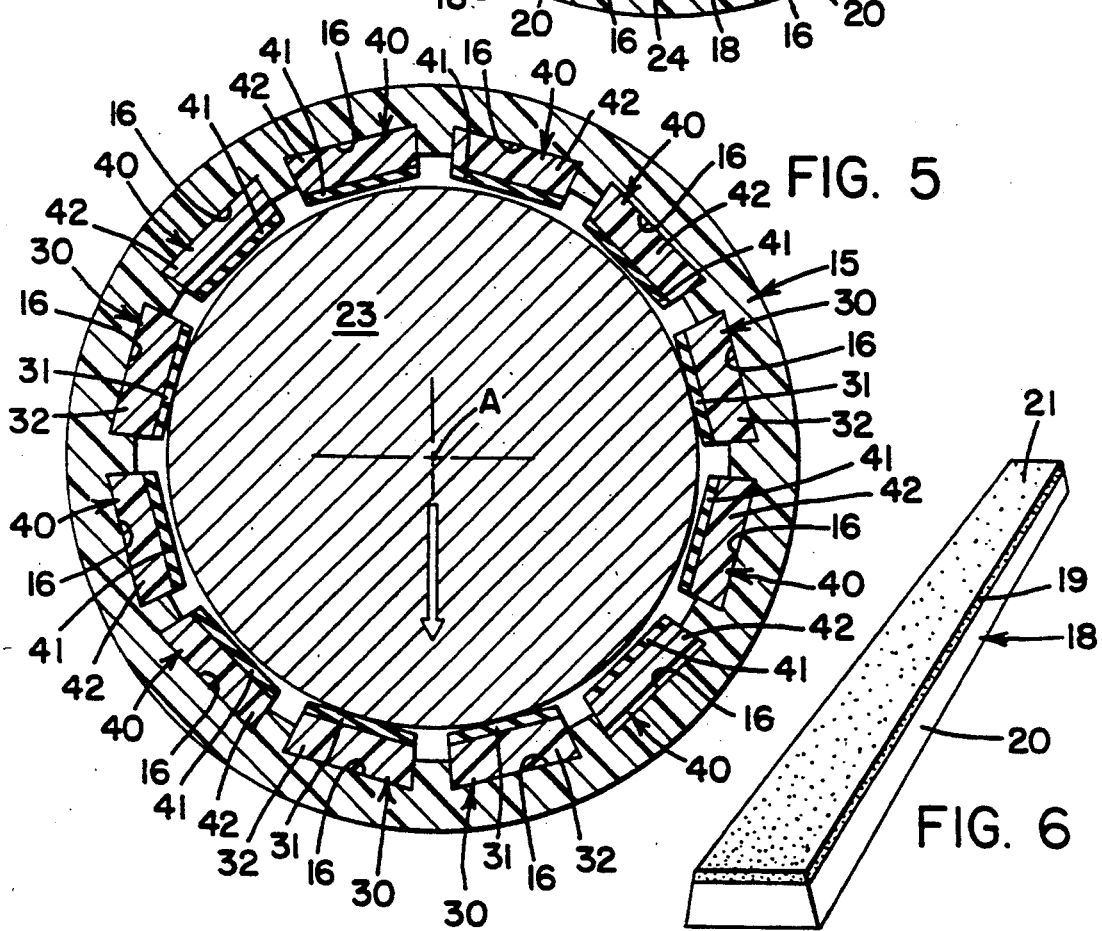

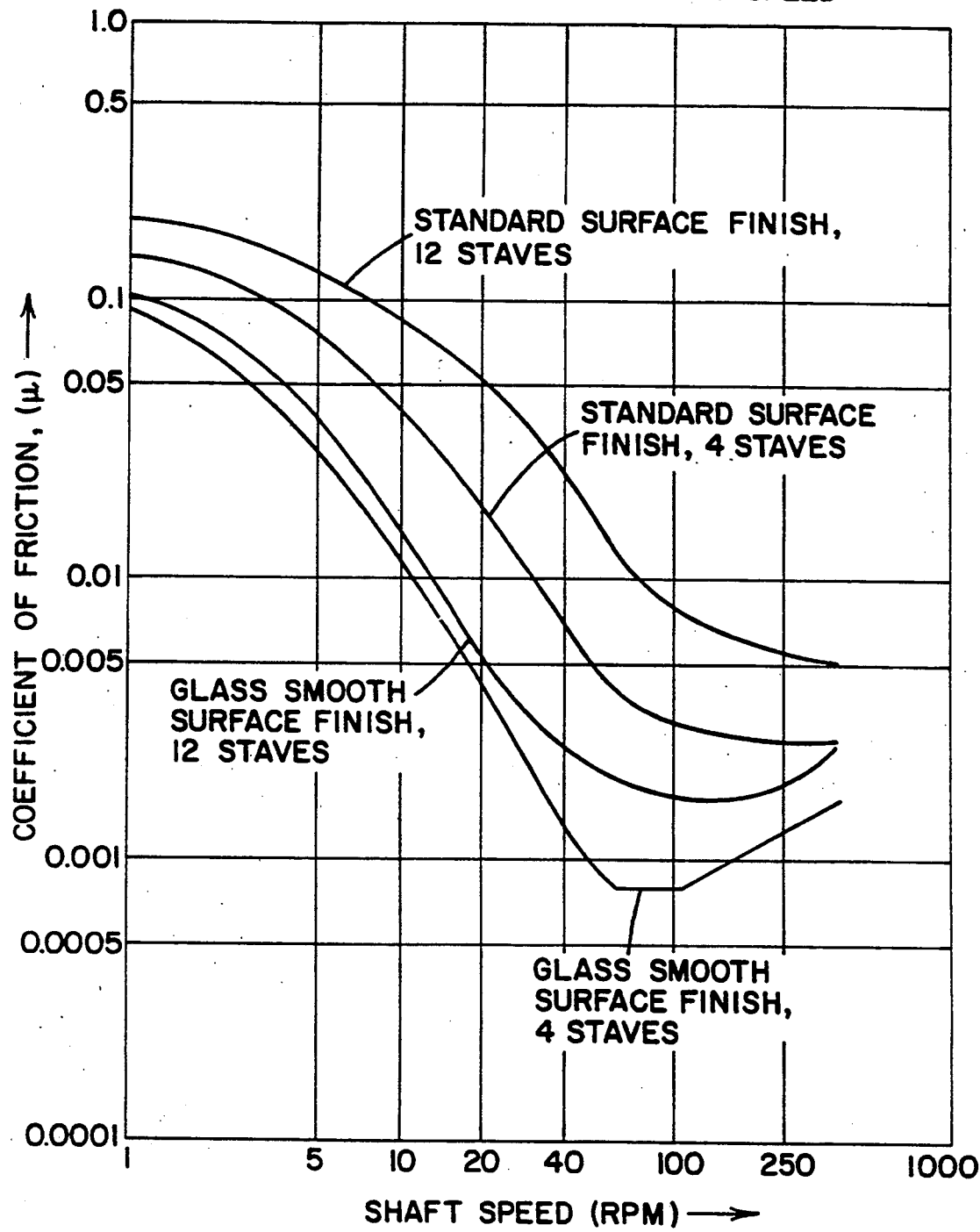

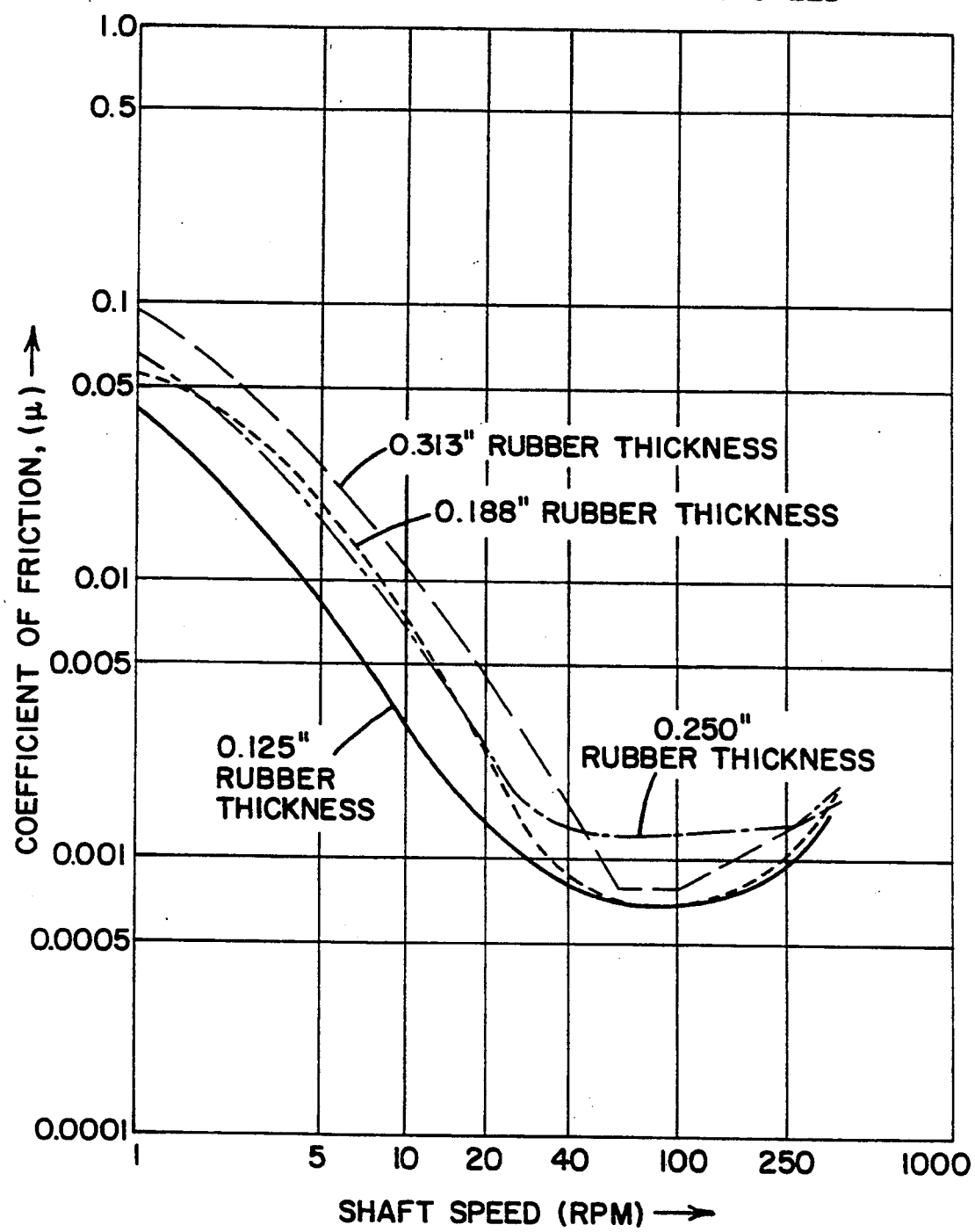

BEARING ASSEMBLY

This is a continuation-in-part application of application Ser. No. 07/930,639, filed Aug. 17, 1992, now abandoned, which is a continuation application Ser. No. 07/382,463, filed Jul. 20, 1989, now abandoned, which is a continuation of originally filed application Ser. No. 07/181,897, filed Apr. 15, 1988, now abandoned.

BACKGROUND OF THE INVENTION

This invention relates to a bearing assembly and more particularly to a new and novel bearing assembly for use in supporting a water lubricated propeller shaft as in large naval ships. Bearing assemblies with elastomeric bearing elements are particularly suited for this purpose because of their excellent ability to withstand the effects of corrosive fluids and to abrasion resulting from particles of foreign matter carried in suspension in the sea water in which the shaft and bearing assembly operates. Such bearing assemblies with their elastomeric bearing elements have been made and are still being made with outer non-corrosive support or shell with a plurality of circumferentially evenly spaced elastomeric staves therein.

The present invention is directed to a novel bearing assembly utilizing an outer shell and an inner shell with a plurality of circumferentially spaced elastomeric bearing elements that have only selected staves in contact with the shaft leaving other staves with clearance space to eliminate any contact with the shaft to thereby reduce the bearing friction torque thus enhancing the performance of the bearing. Test results have shown that for the same rubber thickness there is a substantial reduction in friction when the conventional number of staves (12) is reduced in number (to 4).

SUMMARY OF THE INVENTION

A bearing assembly with a housing that has a central bore. A cylindrical shell is securely mounted within the central bore and present a central opening whose central axis is coincident with the central bore. The shell has a plurality of recesses around its inner periphery to selectively receive bearing staves that project elastomeric bearing elements into the central opening, Certain ones of the staves have their radial innermost bearing surface closer to the central axis than the bearing surfaces of other bearing staves, An alternative is to only mount a few circumferentially spaced staves whose bearing surfaces all are equidistant from the central axis but the circular distance between such staves is such that certain adjacent staves are close to each other while other staves have substantial distance between them,

BRIEF DESCRIPTION OF THE DRAWINGS

FIG. 1 is a side elevational view of a strut and bearing assembly for supporting a rotatable shaft;

FIG. 2 is an elongated front elevational view of the strut and bearing assembly taken on line 2—2 of FIG. 1 with a portion of the cap broken away to show the bearing staves;

FIG. 3 is a side elevational view in cross section of the strut and bearing assembly;

FIG. 4 is a further enlarged cross-sectional view of the bearing assembly taken on line 4—4 of FIG. 3;

FIG. 5 is a cross-sectional view of a modification of the bearing assembly shown in FIG. 4;

FIG. 6 is a perspective view of a bearing stave used in the bearing assembly of FIG. 4;

FIG. 7 is a graph illustrating the difference in coefficient of friction versus shaft speed between a bearing assembly having 12 staves in comparison to 4 staves;

FIG. 8 is a graph illustrating the coefficient of friction versus shaft speed in four stave bearing assemblies having different thickness of rubber.

DETAILED DESCRIPTION

Figure 9:
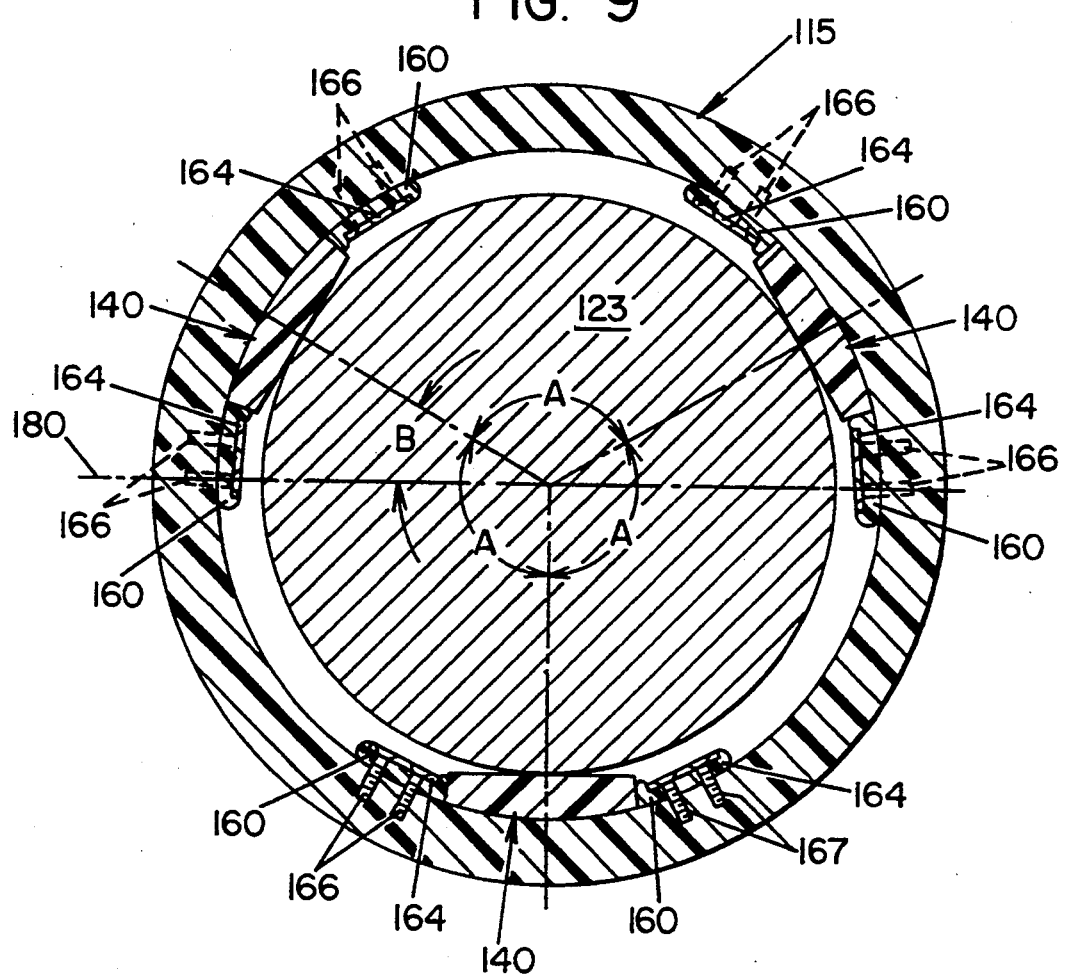
FIG. 9 is a cross sectional view of an alternate embodiment of a bearing assembly in accordance with the present invention.

Referring to the drawings, wherein like reference numerals designate like or corresponding parts throughout the several views, there is shown in FIG. 1 a longitudinally extending bearing housing 10 supported by a strut 11 that extends downwardly from the bottom of a ship. Housing 10 has a pair of annular end faces 12, with each end face having a plurality of circumferentially spaced threaded bores 13. Housing 10 has a central bore 14 to receive a bearing assembly to be described. The bearing assembly has an outer cylindrical shell 15 which has a plurality of circumferentially spaced recesses 16 around the radial inner portion thereof. The recesses 16 are dovetailed slots or grooves which are trapezoidal as viewed in a front elevational view as per FIGS. 4 and 5. Such rigid outer shell may be a metallic structure such as brass, a plastic shell or a composite non-metallic structure with a plurality of annularly disposed radially adjacent layers as in U.S. Pat. No. 3,932,004 embedded with a vulcanized synthetic rubber compound or a cured polyethylene compound. Located in selective recesses 16 of shell 15 are a plurality of bearing staves 18.

Each stave 18 has a resilient elastomeric portion or bearing element 19 secured to a rigid backing member or strip 20.

The rigid backing member or strip 20 is made of an ultra high molecular weight polyethylene having a melt flow index less than 0.15. Such bearing element 19 and strip 20 may be made separably and then cut to their desired shape and then bonded together or such bearing elements 19 and backing strips 20 may be made into separate sheets, then bonded together and then cut into trapezoidal shapes such that the elastomeric inner bearing element 19 has a smaller base than the rigid backing strip 20. The radial innermost portion of the elastomeric bearing element 19 of each stave 18 when installed in the dovetailed groove or recess 16 has a linear flat bearing surfaces 21.

As seen in FIG. 4, twelve grooves or recesses 16 are shown with only four staves 18 installed therein. Two staves 18 are mounted in the two most lowest recesses 16 in the bottom of shell 15 and two staves 18 are installed in two laterally spaced recesses (as seen in FIG. 4) located in the upper portion of the shell 15. Since the two lower staves 18 have their flat surfaces disposed at angles to each other, they support the drive shaft 23 journaled in such bearing assembly. The two upper staves 18 tangentially engage the drive shaft 23 and support it for rotation in cooperative action with the lower staves 18. Drive shaft 23 is centrally located within the central opening of the shell 15 as depicted by a central axis A—A in FIG. 3, which is also the central axis of the central bore of bearing housing 10.

The respective adjacent staves 18 located in the lower portion of the shell 15 (FIG. 4) have a clearance space 24 between them to facilitate the flow of lubricant. Such outer shell 15 and the staves 18 abutting the drive shaft 23 are retained with the central bore of the bearing housing 10 by pairs of semi-circular rings 26 on each side of the bearing housing. Rings 26 have a plurality of circumferentially spaced bores 27 which receive cap screws 28 threaded into the respective threaded bores 13 to firmly secure the staves 18 and shell 15 into housing 10.

A modification of the above described invention is shown in FIG. 5 which discloses the same outer shell 15 with its plural circumferentially spaced recesses or dovetailed slots 16. Every slot or recess 16 will receive either a bearing stave 30 or a bearing stave 40. Bearing staves 30 are substantially identical to the bearing staves 18 of the first embodiment and have a resilient elastomeric portion or bearing element 31 secured to a rigid backing member or strip 32. The bearing staves 40 are also substantially identical to the bearing staves 18 but have their overall thickness less than that of stave 30. Stave 40 has a resilient elastomeric portion or bearing element 41 sectored to a rigid backing member or strip 42 but the overall thickness of strip 42 is less than strip 32 with the thickness of the resilient pad 31 being equal to the thickness of resilient pad 41. This construction thus allows the respective staves 30 to contact the drive shaft while the respective staves 40 have sufficient clearance space to prevent their contact with the drive shaft 23 under normal conditions of operation. With this arrangement of the bearing staves, the load per stave that makes contact is increased and thereby reduces the low shaft speed coefficient of friction since the side staves in the loaded bottom half of the bearing are eliminated. It has been determined the load on a stave is a function of the angle that the rubber surface, such as bearing surface 21, makes to the direction of the total load by the loaded bearing half and with the arranged bearings as described above there is a greater efficiency in the load bearing surface resulting in lower friction torque because the coefficient of friction is lower the higher the normal (perpendicular) load per stave. The total load carried by the bearing is the same regardless of the number of staves in contact with the journal.

Referring to the graph in FIG. 7 there is plotted the coefficient of friction versus shaft speed when comparing bearing assemblies of the type described above having stave rubber thicknesses of 0.313 inches where the only variable is the number of staves. It is to be noted that the plots are log-log, which means that the differential in distance on the graph does not have to be great to be a very substantial reduction in friction as indicated. The uppermost or top curve is that of a standard surface finish 12 stave bearing assembly similar to that shown in FIG. 5, however where all 12 bearing staves make direct abutting contact with the drive shaft 23 and all bearing staves are identical with a 0.313" (inches) rubber thickness (0.79502 cm thickness). Six staves are in the load-carrying bottom half of the bearing. With bearing staves of the same construction and the identical standard surface finish but only have four (4) staves directly supporting the drive shaft as depicted by either FIGS. 4 or 5, the coefficient of friction is substantially reduced. Two staves are in the load-carrying bottom half of the bearing. As an example at shaft speed of 20 rpm, the 4 stave bearing assembly has a coefficient of friction of 0.018 compared to a 12 stave bearing assembly wherein all twelve stave make abutting contact with the drive shaft and provides a coefficient of friction of 0.054. This differential in difference continues for the remainder of the curves. In the comparison of glass smooth surface finish of staves, at 20 rpm's the coefficient of friction for a twelve (12) stave bearing assembly is 0.0054 compared to a four (4) stave bearing assembly which is 0.0042. As the shaft speed is increased in the latter example for glass smooth surface finishes, the coefficient of friction increases dramatically. At 60 rpm, the coefficient of friction for a twelve (12) glass stave bearing assembly is 0.002 compared to a four (4) glass stave bearing assembly of 0.0008, which is substantial.

Referring to the graph in FIG. 8 as a further example of tests performed on four stave bearing assemblies using only glass smooth surface finishes on the rubber surfaces where only the rubber thickness was varied from 0.125 inches (0.3175 cm), to 0.250 inches (0.63 cm) to 0.188 inches (0.4776 cm) to 0.313 inches (0.795 cm), the 0.313 inch rubber thickness initially had slightly higher coefficient of frictions but at the higher speeds showed improved results. The 0.125 inch rubber thickness bearing showed best results. Referring now to FIG. 9, wherein a bearing assembly in accordance with an alternate embodiment of the present invention is generally similar to the bearing assemblies illustrated hereinbefore in the previous figures and is thus indicated by reference numerals corresponding to those discussed above, except that a 100 "prefix" is utilized. A housing 115 has three staves 140 provided around the radial inner portion thereof. Each stave 140 is held in place by a pair of elastomeric members 160. A rigid plate or bar 164 is disposed on top of each elastomeric member 160. A pair of screws or bolts 166 extend through clearance shafts (not shown) in each bar 164 and elastomeric member 160 and engage with threaded holes 167 in housing 115. Tightening screws 166 pulls rigid plate 164 toward housing 115, thereby compressing and deforming elastomeric members 160 to expand sideways and put compression on the staves 140 and hold them in place.

Lower stave 140 supports drive shaft 123, and the two upper staves 140 tangentially engage the drive shaft 123 in cooperative action with the lower stave 140 to prevent extraneous flexing of the shaft 123.

Housing 115 is preferably made from the material described hereinbefore for the previous figures. Staves 140 may be constructed as the staves 40 previously described hereinbefore. Preferably, staves 140 may be made from an elastomeric/plastic composite, such as that described in commonly owned U.S. Pat. No. 3,993,371 or a homogeneous slippery polymer alloy (SPA) such as is disclosed in U.S. Pat. Nos. 4,725,151 and 4,735,982, all of which are hereby incorporated herein by reference. To this end, it has been discovered that certain material factors for staves 140 are important. First, hydrophobic materials are preferred. Second, the elastomer hardness should be about 70 shore A. Third, the ratio of journal diameter of the shaft to the top width of the stave should be about 4 to 7. Fourth, the elastomer thickness should be about 0.125 inch to 0.312 inch. Fifth, the surface finish of the stave should be under 10 micro inches. Sixth, harder polymer alloy bearing contact material, such as the SPA material described above provides the most favorable wear and friction characteristics. The most preferred construction for staves 140 illustrated in FIG. 9 are stave made of the SPA material described above.

Elastomeric members 160 are preferably comprised of natural or nitrile rubber compounds, and are preferably 0.75 to 1.5 inches wide before compression. Rigid plates 164 are preferably comprised of a metal, such as stainless steel, or a hard plastic, such as fiber reinforced epoxy. The compressed elastomeric members 160 expand to grip the sides of the staves 140. They also distort around the ends of the staves to provide an axial locking feature.

The three staves are preferably located approximately 120° apart (angle A), with the two upper staves located approximately 30° (angleB) above horizontal line 180 and the lower stave located approximately 90° below horizontal 180.

Figure 10:
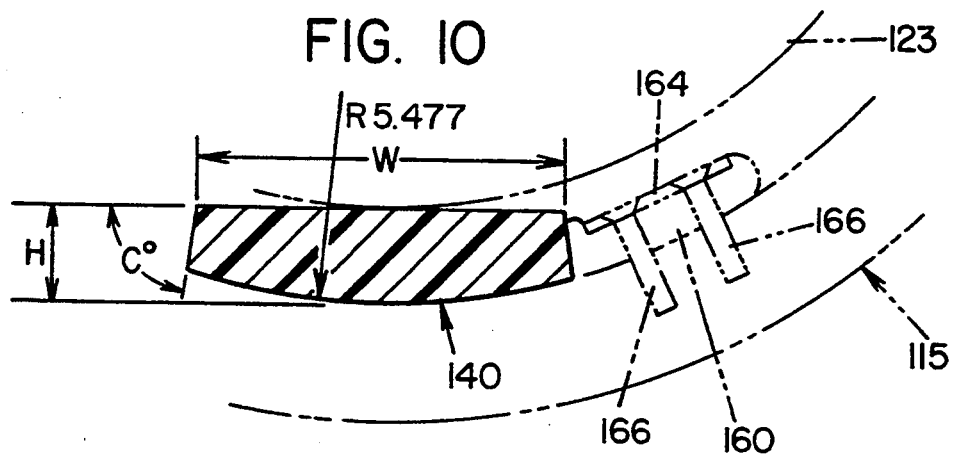
FIG. 10 is a cross sectional view of a bearing stave for use in the bearing assembly shown in FIG. 9.

Referring now to FIG. 10, for a housing 115 having an inner diameter of 10.954 inches, the width D of each stave is preferably 4 inches, the height H is preferably 0.75 inch, and angle C is preferably 80°.

It can be seen that only four staves 18 are necessary to contact journal 23, with the best location for these four staves being shown in FIGS. 4 and 5. These locations can best be described using a reference horizontal line (not shown) which cuts across the center of the cross section of journal 23 (illustrated in FIGS. 4 and 5) extending through bearing 10, thereby distinguishing an upper and lower half of bearing 10, and a reference vertical line which also cuts across the center of journal 23 and bearing 10, thereby distinguishing a right and left half of bearing 10. The two lines thus described break the bearing up into four "quadrants". With reference to such horizontal and vertical reference lines, the preferred location for the four staves 18 is as follows. One stave is to be disposed in each of the four quadrants. The center of the two staves 18 in the upper half of bearing 10 (upper staves) are located so that their center contacts the journal 23 at a point which is at an approximately 15° angle measured between the horizontal line below each stave and a line extending from the center of the journal 23 to the center of the two staves 18 in the upper half. Preferably, the staves extend from approximately 3° off the horizontal line to approximately 20° off the horizontal line, having the center at approximately 15°. The preferred location for the two staves 18 in the lower half of bearing 10 (lower staves) is that the center of the lower staves 18 contact the journal 23 at a point which is at an approximately 75° angle measured between the horizontal line above each stave and a line extending from the center of the journal 23 to the center of the lower staves 18. Preferably, each lower stave extends from approximately 63° off the horizontal line to approximately 87° off the horizontal line, with the center being at approximately 75°. Staves positioned in such manner need not be "backed up" or reinforced with any other staves.

It will be apparent that, although a specific embodiment and a certain modification of the invention has been described in detail, the invention is not limited to the specifically illustrated and described constructions since variations may be made without departing from the principles of the invention.

We claim:

1. A bearing assembly having a housing with a central bore therein, a cylindrical shell mounted within said central bore and attached to said housing, said cylindrical shell having an central opening with a central axis, said shell having a plurality of circumferentially spaced recesses on its inner peripheral body portion, bearing staves mounted in certain ones of said recesses but less than-all of said recesses, all of said staves having portions thereof projecting into said central opening, all of said staves having radially disposed inner flat surfaces, and each flat surface has a longitudinally extending center line lying parallel to and equidistant from the center of said central axis.

2. A bearing assembly as set forth in claim 1 wherein all of said staves have their radially innermost portion made from elastomeric material, and all of said recesses are evenly spaced circumferentially around said shell.

3. A bearing assembly as set forth in claim 2 wherein said central axis lies along a horizontal line, and at least two of said staves that are mounted in said certain ones of said recesses are located in the lowest portion of said shell, and the remaining ones of said staves located in said certain ones of said recesses are located above a horizontal plane that passes through said central axis.

4. A bearing assembly having a housing with a central bore therein, said central bore having a horizontally extending central axis, a cylindrical housing mounted within said central bore and secured to said housing, said cylindrical housing having a central opening whose axis is coincident with said central axis, said housing having a first set of staves and a second set of staves circumferentially spaced around said housing, the radial innermost portion of all of said staves having elastomeric flat surfaces projecting into said central opening, all of said first set of staves projecting into said central opening a distance that is greater than said second sen of staves as measured from said central axis such that said flat surfaces of said first set make tangential contact with an annular circle that has a smaller radius than an annular circle that makes tangential contact with said flat surfaces of said second set of staves as measured from said central axis.

5. A bearing assembly comprising:
    a housing having a central bore;
    a cylindrical shell mounted within said central bore and attached to said housing, said cylindrical shell having a) a central opening with a central axis, wherein said central axis lies along a horizontal line and b) an inner peripheral body portion defined by said central opening;
    a first pair of bearing staves disposed on the inner peripheral body portion of said shell, wherein said first pair of bearing staves are disposed above said horizontal line such that their centers are on the order of 15° above said horizontal line when measured from said horizontal line to a radial line extending from said central axis to the center of said first pair of bearing staves;
    a second pair of bearing staves disposed on the inner peripheral body portion of said shell, said second pair of bearing staves disposed below said horizontal line such that their centers are on the order of 75° below said horizontal line when measured from said horizontal line to a radial line extending from said central axis to the center of said first pair of bearing staves, wherein all of said bearing staves have portions thereof projecting into said central opening, all of said staves having radially disposed inner flat surfaces, and each flat surface having a longitudinally extending center line lying parallel to and equidistant from the center of said central axis.

6. A bearing assembly according to claim 5, wherein all of said bearing staves have their radially innermost portion made from elastomeric material.

7. A bearing assembly according to claim 5, wherein all of said bearing staves are comprised of:
   a radially innermost portion made from elastomeric material; and,
   an intermediate portion disposed adjacent to said radially innermost portion made from ultra high molecular weight polyethylene.

8. A bearing assembly comprising:
   a housing having a central bore;
   a cylindrical shell mounted within said central bore and attached to said housing, said cylindrical shell having a) a central opening with a central axis, wherein said central axis lies along a horizontal line and b) an inner peripheral body portion defined by said central opening;
   a first pair of bearing staves disposed on the inner peripheral body portion of said shell, wherein said first pair of bearing staves are disposed such that they extend along the arc of said cylindrical shell from on the order of 3° to 20° above said horizontal line when measured from said horizontal line to a radial line extending from said central axis to said first pair of bearing staves;
   a second pair of bearing staves disposed on the inner peripheral body portion of said shell, wherein said second pair of bearing staves are disposed such that they extend along the arc of said central bore from on the order of 63° to 87° below said horizontal line when measured from said horizontal line to a radial line extending from said central axis to said first pair of bearing staves,
   wherein all of said bearing staves have portions thereof projecting into said central opening, all of said staves having radially disposed inner flat surfaces, and each flat surface having a longitudinally extending center line lying parallel to and equidistant from the center from said central axis.

9. A bearing assembly according to claim 8, wherein all of said bearing staves have their radially innermost portion made from elastomeric material.

10. A bearing assembly according to claim 8, wherein all of said bearing staves are comprised of: a radially innermost portion made from elastomeric material; and, an intermediate portion disposed adjacent to said radially innermost portion made from ultra high molecular weight polyethylene.

11. A bearing assembly having a housing with a central bore therein, a cylindrical shell mounted within said central bore and attached to said housing, said cylindrical shell having a central opening with a central axis, said shell having a plurality of circumferentially spaced recesses on its inner peripheral body portion, bearing staves mounted in certain ones of said recesses but less than all of said recesses, all of said staves having portions thereof projecting into said central opening, all of said staves having radially disposed inner flat surfaces, and each flat surface has a longitudinally extending center line lying parallel to and equidistant from the center of said central axis, all of said staves having their radially innermost portion made from elastomeric material, all of said recesses are evenly spaced circumferentially around said shell, other staves are mounted in those recesses not containing said bearing staves in said certain ones of said recesses, and said other staves having their radial innermost surface lying at a greater radial distance from said central axis than the radial innermost surface of those staves in said certain ones of said recesses as measured along a plane passing normal to said central axis.

12. A bearing assembly according to claim 11, wherein said central axis lies along a horizontal line, at least two of said certain ones of said recesses lying on opposite sides of a vertical plane passing through said central axis, and the remaining ones of said certain ones of said recess lying above a horizontal plane passing through said central axis.

13. A bearing assembly having a housing with a central bore therein, said central bore having a horizontally extending central axis, a cylindrical shell mounted within said central bore and secured to said housing, said cylindrical shell having a central opening whose axis is coincident with said central axis, said shell having a first set of staves and a second set of staves circumferentially spaced around said shell, the radial innermost portion of all of said staves having elastomeric flat surfaces projecting into said central opening, all of said first set of staves projecting into said central opening a fixed distance that is greater than said second set of staves as measured from said central axis such that said flat surfaces of said first set make tangential contact with an annular circle that has a smaller radius than an annular circle that makes tangential contact with said flat surfaces of said second set of staves as measured from said central axis, wherein said elastomeric flat surfaces of said first and second set of staves define approximate concentric circles having said central axis as a common center axis.

14. A bearing assembly as set forth in claim 13, wherein at least two of said staves of said first set lie on each side of a vertical plane passing through said central axis, at least two of said staves of said first set that lie on each side of said vertical plane also pass through said central axis, and said staves of said first set that lie above said horizontal plane lie on opposite sides of said vertical plane.

15. A bearing assembly as set forth in claim 14, wherein two staves of said first set that lie below said horizontal plane are the closest staves to said vertical plane of all staves of said first set.

16. A bearing assembly comprising a housing with a central bore therein, said central bore having a horizontally extending central axis, a cylindrical shell mounted within said central bore and secured to said housing, said cylindrical shell having a central opening whose axis is coincident with said central axis, said shell having a first set of staves and a second set of staves circumferentially spaced around said shell, the radial innermost portion of all of said staves having elastomeric flat surfaces projecting into said central opening, said first set of staves located below a horizontal plane passing through said central axis, said second set of staves located above said horizontal plane, and the longitudinal center line of all of said flat surface are parallel to and equidistant from said central axis to provide a tangential contact with a drive shaft mounted in said cylindrical shell, said first set of staves bisected by a vertical plane passing through said central axis, said first set of staves consisting of a pair of staves, said second set of staves consisting of a pair of staves, and said first set and said second set of staves being the sole means to support said drive shaft.

17. A bearing assembly having a housing with a central bore therein, a cylindrical shell mounted in said bore of said housing, said shell having a central opening with a longitudinally extending axis, a plurality of circumferentially spaced elastomeric staves mounted in said shell and extending into said central opening, each of said staves having a radially disposed inner flat surface lying equidistant from said axis of said central opening, two of said staves lying closely adjacent to each other while the remaining ones of said staves being a substantially greater circumferential distance from said two staves as measured along a circle whose radius as measured from said central axis is constant to thereby lower the frictional forces on a drive shaft journaled in said central opening and contacting all of said inner flat surfaces of said staves.

18. A bearing assembly comprising:
   a cylindrical housing having a) a central opening with a central axis, wherein said central axis lies along a horizontal line and b) an inner peripheral body portion defined by said central opening;
   a first pair of bearing staves disposed on the inner peripheral body portion of said housing, wherein said first pair of bearing staves are disposed above said horizontal line such that their centers are on the order of 15° above said horizontal line when measured from said horizontal line to a radial line extending from said central axis to the center of said first pair of bearing staves;
   a second pair of bearing staves disposed on the inner peripheral body portion of said housing, said second pair of bearing staves disposed below said horizontal line such chat their centers are on the order of 75° below said horizontal line when measured from said horizontal line to a radial line extending from said central axis to the center of said first pair of bearing staves; and,
   gripping means disposed adjacent each one of said bearing staves on the inner peripheral body portion of said housing for securing each one of said bearing staves in place,
   wherein all of said bearing staves have portions thereof projecting into said central opening, all of said bearing staves having radially disposed inner flat surfaces, and each flat surface having a longitudinally extending center line lying parallel to and equidistant from the center of said central axis.

19. A bearing assembly according to claim 18, wherein all of said bearing staves have their radially innermost portion made from elastomeric material.

20. A bearing assembly according to claim 18, wherein all of said bearing staves are comprised of:
   a radially innermost portion made from elastomeric material; and,
   an intermediate portion disposed adjacent to said radially innermost portion made from ultra high molecular weight polyethylene.

21. A bearing assembly according to claim 18, wherein all of said bearing staves are comprised of a slippery polymer alloy.

22. A bearing assembly according to claim 18, wherein all of said gripping means are comprised of elastomeric material.

23. A bearing assembly according to claim 18, wherein all of said gripping means are comprised of elastomeric material compressed by a rigid plate.

24. A bearing assembly comprising:
   a housing having a central bore;
   a cylindrical housing mounted within said central bore and attached to said housing, said cylindrical housing having a) a central opening with a central axis, wherein said central axis lies along a horizontal line and b) an inner peripheral body portion defined by said central opening;
   a first pair of bearing staves disposed on the inner peripheral body portion of said housing, wherein said first pair of bearing staves are disposed such that they extend along the arc of said cylindrical housing from on the order of 30° above said horizontal line when measured from said horizontal line to a radial line extending from said central axis to said first pair of bearing staves;
   a second bearing stave disposed on the inner peripheral body portion of said housing such that it extends along the arc of said central bore on the order of 90° below said horizontal line when measured from said horizontal line to a radial line extending from said central axis to said first pair of bearing staves,
   wherein all of said bearing staves have portions thereof projecting into said central opening, all of said bearing staves having radially disposed inner flat surfaces, and each flat surface having a longitudinally extending center line lying parallel to and equidistant from the center from said central axis.

25. A bearing assembly according to claim 24, wherein all of said bearing staves have their radially innermost portion made from elastomeric material.

26. A bearing assembly according to claim 24, wherein all of said bearing staves are comprised of:
   a radially innermost portion made from elastomeric material; and,
   an intermediate portion disposed adjacent to said radially innermost portion made from ultra high molecular weight polyethylene.

27. A bearing assembly according to claim 24, wherein all of said bearing staves are comprised of a slippery polymer alloy.

28. A bearing assembly according to claim 24, wherein all of said gripping means are comprised of elastomeric material.

29. A bearing assembly according to claim 24, wherein all of said gripping means are comprised of elastomeric material compressed by a rigid plate.

30. A bearing assembly comprising a housing with a central bore therein, said central bore having a horizontally extending central axis, a cylindrical housing mounted within said central bore and secured to said housing, said cylindrical housing having a central opening whose axis is coincident with said central axis, said housing having a first set of bearing staves located above said horizontal plane, and a single stave located below a horizontal plane passing through said central axis, the radial innermost portion of all of said bearing staves having elastomeric flat surfaces projecting into said central openings the longitudinal center line of all of said flat surfaces being parallel to and equidistant from said central axis to provide a tangential contact with a drive shaft mounted in said cylindrical housing, said first set of bearing staves bisected by a vertical plane passing through said central axis, said first set of bearing staves consisting of a pair of bearing staves, and said first set of bearing staves and said single stave being the sole means to support said drive shaft.

31. A bearing assembly according to claim 30, wherein all of said bearing staves are comprised of:
   a radially innermost portion made from elastomeric material; and, an intermediate portion disposed adjacent to said radially innermost portion made from ultra high molecular weight polyethylene.

32. A bearing assembly according to claim 30, wherein all of said bearing staves are comprised of a slippery polymer alloy.

33. A bearing assembly according to claim 30, further comprising gripping means disposed adjacent each one of said bearing staves on the inner peripheral body portion of said housing for securing each one of said bearing staves in place.

34. A bearing assembly according to claim 33, wherein all of said gripping means are comprised of elastomeric material.

35. A bearing assembly according to claim 33, wherein all of said gripping means are comprised of elastomeric material compressed by a rigid plate.

36. A bearing assembly comprising a housing with a central bore therein, said central bore having a horizontally extending central axis, a cylindrical housing mounted within said central bore and secured to said housing, said cylindrical housing having a central opening whose axis is coincident with said central axis, said housing having three bearing staves disposed on the inner peripheral body portion of said housing on the order of 120° apart the radial innermost portion of all of said bearing staves having elastomeric flat surfaces projecting into said central opening, the longitudinal center line of all of said flat surfaces being parallel to and equidistant from said central axis to provide a tangential contact with a drive shaft mounted in said cylindrical housing, said three bearing staves being the sole means to support said drive shaft.

37. A bearing assembly according to claim 36, wherein all of said bearing staves are comprised of:
a radially innermost portion made from elastomeric material; and,
an intermediate portion disposed adjacent to said radially innermost portion made from ultra high molecular weight polyethylene.

38. A bearing assembly according to claim 36, wherein all of said bearing staves are comprised of a slippery polymer alloy.

39. A bearing assembly according to claim 36, further comprising gripping means disposed adjacent each one of said bearing staves on the inner peripheral body portion of said housing for securing each one of said bearing staves in place.

40. A bearing assembly according to claim 39, wherein all of said gripping means are comprised of elastomeric material.

41. A bearing assembly according to claim 40, wherein all of said gripping means are comprised of elastomeric material compressed by a rigid plate.

* * * * *